(12) United States Patent
Ordway et al.

(10) Patent No.: US 10,735,304 B2
(45) Date of Patent: Aug. 4, 2020

(54) SYSTEM AND METHOD FOR REMOTE MANAGEMENT OF SALE TRANSACTION DATA

(71) Applicant: Shopkeep, Inc., New York, NY (US)

(72) Inventors: Jason Ordway, New York, NY (US); Joshua Vickery, New York, NY (US); Kieran Breen, Belfast (IE); Jordan Hamill, Belfast (IE)

(73) Assignee: Shopkeep Inc., New York, NY (US)

( * ) Notice: Subject to any disclaimer, the term of this patent is extended or adjusted under 35 U.S.C. 154(b) by 182 days.

(21) Appl. No.: 14/918,446

(22) Filed: Oct. 20, 2015

(65) Prior Publication Data
US 2016/0043928 A1 Feb. 11, 2016

Related U.S. Application Data

(63) Continuation-in-part of application No. 13/037,048, filed on Feb. 28, 2011, now Pat. No. 9,317,844.
(Continued)

(51) Int. Cl.
*H04L 12/751* (2013.01)
*H04L 12/18* (2006.01)
(Continued)

(52) U.S. Cl.
CPC ............. *H04L 45/02* (2013.01); *G06Q 20/20* (2013.01); *G06Q 20/206* (2013.01); *H04L 12/18* (2013.01);
(Continued)

(58) Field of Classification Search
CPC . H04L 45/02; H04L 67/1097; H04L 67/1095; H04L 12/18; G06Q 20/20; G06Q 20/206
See application file for complete search history.

(56) References Cited

U.S. PATENT DOCUMENTS 5,678,010 A 10/1997 Pittenger et al.
5,696,909 A 12/1997 Wallner
(Continued)

OTHER PUBLICATIONS

Mikhail T. Galeev titled "Catching the Z-Wave". Oct. 2, 2006. From Embedded.com (Website title: embedded cracking the code to systems development). Retrieved online from <<https://www.embedded.com/design/connectivity/4025721/Catching-the-Z-Wave#>> on Feb. 5, 2019. 8 pages.*

*Primary Examiner* — A. Hunter Wilder
*Assistant Examiner* — Joseph M Mutschler
(74) *Attorney, Agent, or Firm* — Ted Sabety; Sabety + associates, PLLC

(57) ABSTRACT

This invention discloses a novel system and method and system for sharing a data item among a plurality of computers connected in an arbitrary network topology. In the preferred embodiment, each of the plurality of computers has a local copy of the data item, but can only edit the copy by obtaining a token from the current token owner, thereby becoming a new current token owner. When the token owner makes a change to the data item, the change is broadcast to the other computers, along with the identity of the new current token owner. Routing of token requests and broadcasts is accomplished by means of each computer calculating a routing table based on information it receives from those computers to which it is directly connected on the network.

10 Claims, 4 Drawing Sheets

Related U.S. Application Data

(60) Provisional application No. 62/066,639, filed on Oct. 21, 2014.

(51) Int. Cl.
    *H04L 29/08*     (2006.01)
    *G06Q 20/20*     (2012.01)

(52) U.S. Cl.
    CPC ...... *H04L 67/1095* (2013.01); *H04L 67/1097* (2013.01)

(56) References Cited

U.S. PATENT DOCUMENTS

| | | | |
|---|---|---|---|
| D401,231 S | 11/1998 | Schechtman | |
| 5,903,873 A | 5/1999 | Peterson et al. | |
| 5,938,095 A | 8/1999 | Haar et al. | |
| 6,002,395 A | 12/1999 | Wagner et al. | |
| 6,088,682 A | 7/2000 | Burke | |
| D436,580 S | 1/2001 | Navano | |
| 6,441,808 B1 | 8/2002 | Hashimoto | |
| 6,938,095 B2 * | 8/2005 | Basturk | G06F 9/542 370/351 |
| 7,171,370 B2 | 1/2007 | Burke | |
| 7,251,632 B1 | 7/2007 | Ogg et al. | |
| 7,353,181 B2 | 4/2008 | Musso | |
| 7,697,920 B1 | 4/2010 | McClain | |
| 8,090,402 B1 | 1/2012 | Fujisaki | |
| 8,099,727 B2 | 1/2012 | Bahat | |
| D656,946 S | 4/2012 | Judy | |
| D657,368 S | 4/2012 | Magee | |
| 8,190,530 B2 | 5/2012 | Edmond et al. | |
| 8,195,656 B2 | 6/2012 | Grasset | |
| D667,838 S | 9/2012 | Magee | |
| D673,165 S | 12/2012 | Ospina Gonzalez | |
| D678,306 S | 3/2013 | Philopoulos | |
| D682,855 S | 5/2013 | Iden | |
| D689,086 S | 9/2013 | Philopoulos | |
| D690,721 S | 10/2013 | Tee | |
| 8,646,685 B2 | 2/2014 | Bishop | |
| 9,131,012 B2 | 9/2015 | Farias | |
| 9,270,585 B2 * | 2/2016 | Manion | H04L 45/02 |
| 9,317,844 B2 | 4/2016 | Richelson et al. | |
| 9,514,450 B2 | 12/2016 | Farias | |
| 9,799,034 B1 | 10/2017 | Varma et al. | |
| 2003/0101257 A1 | 5/2003 | Godwin | |
| 2003/0172127 A1 | 9/2003 | Northrup et al. | |
| 2003/0212637 A1 | 11/2003 | Turner | |
| 2003/0236755 A1 | 12/2003 | Dagelet | |
| 2004/0120333 A1 | 6/2004 | Geddes et al. | |
| 2004/0177004 A1 | 9/2004 | Mueller et al. | |
| 2004/0179224 A1 | 9/2004 | Kidokoro | |
| 2004/0181454 A1 | 9/2004 | Manno | |
| 2004/0254676 A1 | 12/2004 | Blust | |
| 2005/0021409 A1 | 1/2005 | Michaud et al. | |
| 2005/0234943 A1 * | 10/2005 | Clarke | H04L 67/38 |
| 2006/0031237 A1 | 2/2006 | DeAnna | |
| 2006/0235755 A1 | 10/2006 | Mueller et al. | |
| 2006/0258337 A1 | 11/2006 | Fujita | |
| 2007/0015436 A1 | 1/2007 | Fisher | |
| 2007/0156436 A1 | 7/2007 | Fisher et al. | |
| 2007/0276763 A1 | 11/2007 | Kleinman et al. | |
| 2008/0208696 A1 | 8/2008 | Olson | |
| 2008/0267116 A1 * | 10/2008 | Kang | H04L 45/20 370/328 |
| 2010/0106651 A1 | 4/2010 | Tate | |
| 2010/0125509 A1 | 5/2010 | Kranzley | |
| 2010/0191979 A1 | 7/2010 | Zipperer et al. | |
| 2010/0198728 A1 | 8/2010 | Aabye | |
| 2011/0125566 A1 | 5/2011 | McLaughlin et al. | |
| 2011/0218872 A1 | 9/2011 | Richelson et al. | |
| 2011/0225055 A1 | 9/2011 | Takahasi | |
| 2011/0231280 A1 | 9/2011 | Farah | |
| 2011/0246284 A1 | 10/2011 | Chaikin et al. | |
| 2011/0251892 A1 | 10/2011 | Laracey | |
| 2012/0054050 A1 | 3/2012 | Ziegler et al. | |
| 2012/0066363 A1 | 3/2012 | Somogyi | |
| 2012/0084135 A1 | 4/2012 | Nissan et al. | |
| 2012/0160912 A1 | 6/2012 | Laracey | |
| 2012/0191522 A1 | 7/2012 | McLaughlin et al. | |
| 2013/0232017 A1 | 9/2013 | Nathanel et al. | |
| 2014/0097241 A1 | 4/2014 | Tovar et al. | |
| 2014/0244409 A1 | 8/2014 | Nathanel et al. | |
| 2015/0199667 A1 | 7/2015 | Fernando et al. | |
| 2015/0339649 A1 | 11/2015 | Pi Farias | |

\* cited by examiner

SYSTEM AND METHOD FOR REMOTE MANAGEMENT OF SALE TRANSACTION DATA

This application claims priority as a non-provisional continuation to U.S. Provisional Patent Application No. 62/066,639 filed on Oct. 21, 2014 and incorporates that application by reference in its entirety. This application claims priority to U.S. patent application Ser. No. 13/037,048 filed on Feb. 28, 2011 as a continuation in part and incorporates that application by reference in its entirety.

This application incorporates by reference in their entireties U.S. Provisional Patent Application No. 61/940,195 filed on Feb. 14, 2014, U.S. Provisional Patent Application No. 61/948,126 filed on Mar. 5, 2014, U.S. Provisional Patent Application No. 61/973,701 filed on Apr. 1, 2014 and U.S. Provisional Patent Application No. 62/015,938 filed on Jun. 23, 2014.

FIELD OF INVENTION

This invention is related to point of sale systems typically used in retail stores. The invention is related to a novel architecture that permits a retail store owner to obtain sale transaction data management as a service instead of purchasing such a system and maintaining it. In one embodiment, the invention involves a plurality of register instances each operating on individual computer devices, where for a given retail store owner (or other kind of retail service) that are connected by one or more wireless computer network connections associated with the retail service utilizing the invention.

BACKGROUND

In typical point of sale systems for retail stores, a set of special purpose computers are positioned at the retail checkout locations. These are locally networked with a server located at the site of the retail store. For many retail stores, this requires a level of system maintenance responsibility that is beyond the staff capabilities of the retailer or too costly. In this invention, the point of sale system is designed so that it is provided as a service shared among participating retail vendors. With this kind of an architecture, the invention provides the service security, data integrity, robustness and redundancy.

DETAILED DESCRIPTION OF THE PREFERRED EMBODIMENTS

Figure 1:
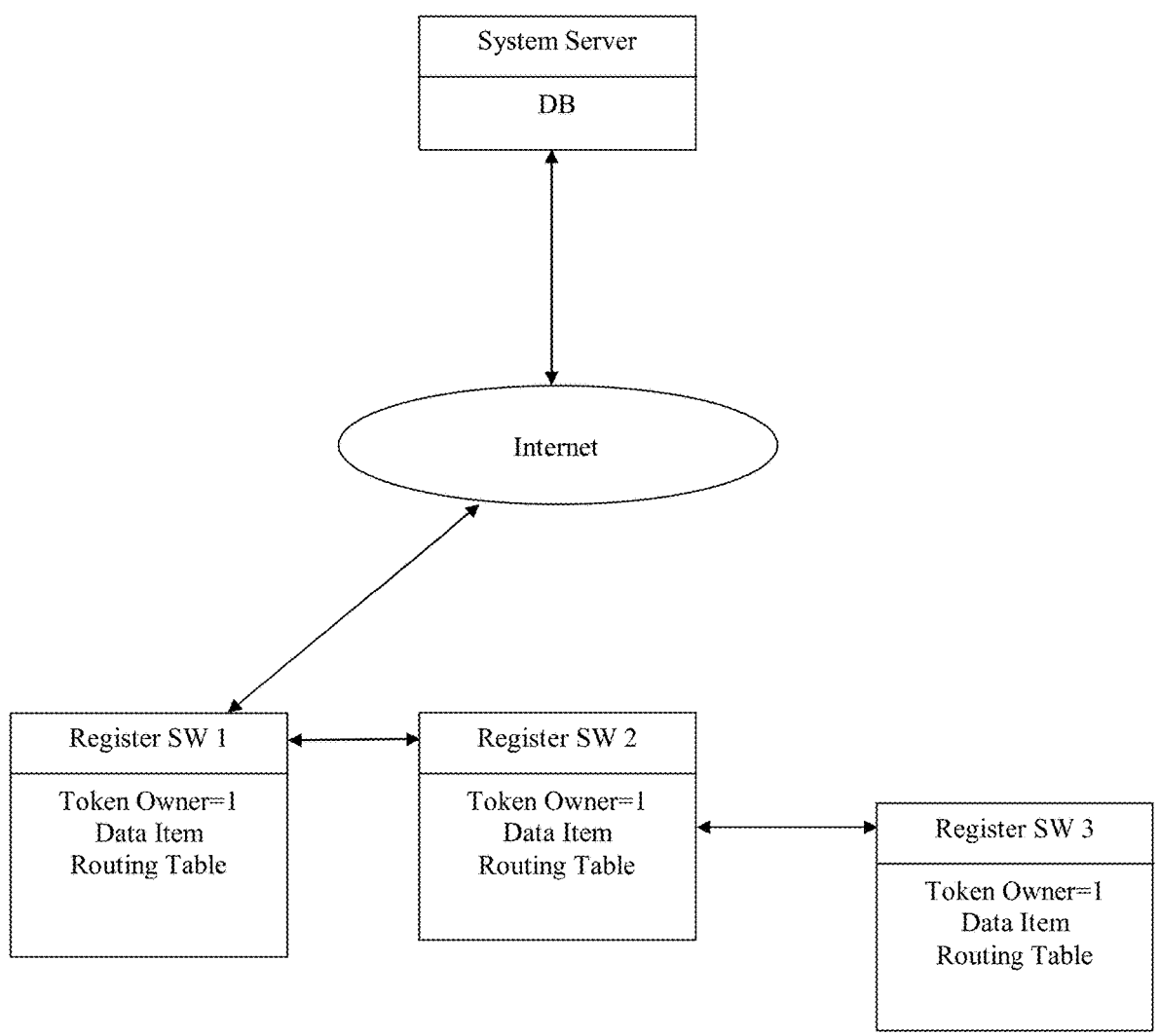
FIG. 1. Schematic of example system architecture.

The typical embodiment of the system is centered around one or more servers that are hosted externally from the point of sale locations of the one or more vendors that use the system. Typically the servers are connected to the Register instances over a Wide Area Network, typically the Internet. A server is a computer containing or operatively connected, through a data network, one or more mass storage devices. The servers operate together as the repository of vendor information associated with the point of sale terminals. In the preferred embodiment, the terminals are typical personal computers operating an instance of the Register software. In other embodiments, the terminals are portable tablet devices running the Register software, where the tablet device has a wireless network connection that ultimately connects the Register software instance in a bi-directional data network connection to the servers. The servers are operatively connected to the point of sale terminals over a data network, a wide area network. In one embodiment, the Internet is the wide area network. The servers are accessed in several ways. The primary access is by means of the point of sale terminals. However, the servers are accessible from the Internet by other computers as well. The point of sale terminals is typically a personal computer running a typical operating system, for example, Windows™. In the preferred embodiment, a point of sale terminal is created by means of operating the Register software on a personal computer running Windows™. In other embodiments, the register instances are an application running on one or more iPads™ or other similar tablet device.

Register Software Instance: Each computer at a point of sale location that acts as the transaction input interface or terminal is a typical personal computer running an instance of the point of sale software, or Register software. The Register software is designed to execute particular protocols that cause communication between the Register software instance and the servers. The protocol is designed to ensure that the Register software has access to that part of the database hosted by the servers associated with the vendor whose Register terminal is making the access. In this architecture, each Register instance communicates across the wide area network, including the Internet to the servers housing the database information associated with the vendor. In addition, the Register software is designed so that where a vendor has more than one terminal operating the Register software, the specific instance of Register that is accessing the server is identifiable by the database.

Once the Register software has been securely installed on a machine, the vendor personnel can use it to connect to their specific database operating on the server. An authorized vendor personnel is prompted to input the vendor identity, a user name and password to log in as the operator for the cash register station. Once the Register instance has been initialized, the retail store personnel can use it to tally sales. The Register software presents a browser type interface with a user-customizable series of interactive screens that present the workflow typically used by that vendor.

At that point a transaction ticket is created, meaning a data object representing the transaction. That ticket contains a Register identifier, personnel identifier, item number, price and any other information the vendor has decided to associate with the transaction. Normally, the transaction ticket is transmitted to the server in conformance with the interactive protocol with the server. However, there are some embodiments where a transaction is pending and remains on the device and is not transmitted up to the server until the end of a shift or for periodic back purposes. For example, at a restaurant, the waiter, who is a user of the invention, may input an order for one or more items into the Register instance that is associated with one customer or customer group. This pending set of orders may be considered an "order", and be embodied in a data record stored in the device running the register instance. This order may remain local and pending. However, in this context, it may be that more than one person working for the retail service needs access to that order. Therefore, the system is adapted to share the stored order data record across all of the active register instances associated with the retail service without a transmission of the data record to the remote server.

In one embodiment, as soon as a user of one register instance creates a new order or transaction ticket, the register instance application automatically shares it among all of the other devices that are related to the same register instance. This makes it possible for more than one service personnel at a retail service provider service the same customer or customer group. In this embodiment, when the new order data structure is created, the register instance broadcasts that data structure to all of the related devices. In this context the register instances that are active and operating at a retail venue may be connected in a variety of ways. Some may be sharing the same Wi-Fi™ network, for example, while others may be connected to one register instance by means of a Bluetooth™ connection. See FIG. 3.

The register instance that is performing the broadcast, first creates another data container that acts as a data item that contains the new ticket or order data structure as a data payload. In one variation, the data container is comprised of the name or logical address of the destination device. In another variation, the data container contains a value that represents "broadcast", meaning that all of the related register instances are to receive the data payload. In the first variation, the register instance that is broadcasting transmits out N−1 data containers, where N is the number of active related register instances associated with the retail venue. In the second variation, the register instance transmits only I data items, where I is the number of register instances directly linked to the transmitting register instances. The remaining remote register instances are therefore some J where I+J=N.

In the preferred embodiment, the broadcasting register instance relies on a routing table that represents the manner for the register instance to reach each of the other register instance devices. The typical routing table is comprised of rows representing each device, and columns representing where the broadcasting register instance should transmit the data container in order for it to propagate to the designated destination. Each peer in the network computes its own routing table. By peer, it is understood to mean a device that can receive the data payload and transmit the data payload on to the next recipient in accordance with the routing table.

The first step to create the routing table is determining which destination devices are related. In one embodiment, the register instances discovery all directly reachable registers using a zero configuration network configuration protocol, also referred to as "zeroconf." A zeroconf protocol is able to operate correctly in the absence of pre-configured information received from either a user or infrastructure services such as conventional DHCP or DNS servers. Zeroconf protocols may use configured information, when it is available, but do not rely on it being present. For example, the use of MAC addresses (i.e. layer two addresses) as parameters in zeroconf protocols is generally acceptable because they are globally unique and readily available on most devices of interest. The benefits of zeroconf protocols over existing configured protocols are an increase in the ease-of-use for end-users and a simplification of the infrastructure necessary to operate protocols. In the preferred embodiment, the invention relies on the Bonjour™ protocol. In another embodiment, each time a register instance is activated and recognized by the server system, the server system transmits to all the other active register instances associated with the same account, the identity of the newly activated device. For devices that are connected through another device, for example, a first device may be connected by Wifi through to the internet and the server, while a second device may be connected by Bluetooth™ to the first device. Upon such activation, the network topology may have changed, so in response to receiving a command that a new device has joined the network, all of the peers recalculate their routing table.

Figure 2:
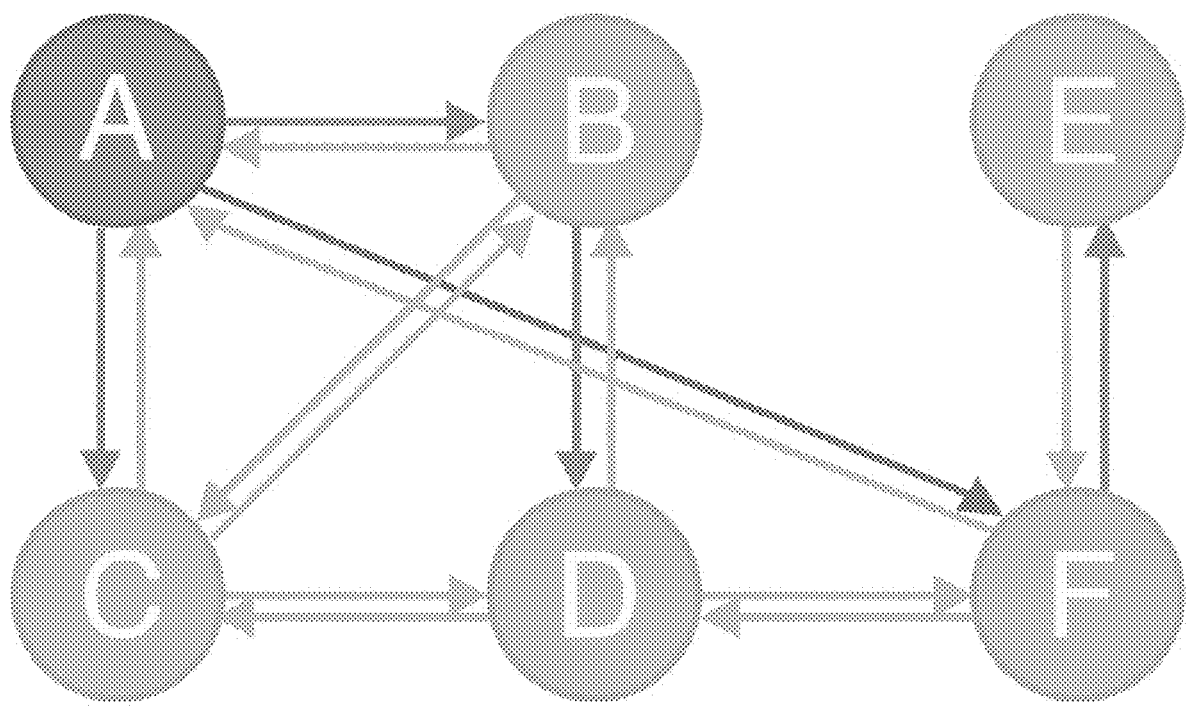
FIG. 2. Example network topology architecture.

Register instances that operate on a first device that acts as the go-between peer for the second device receive messages from the server that are comprised of data representing that they are broadcast messages Since each register instance holds a complete routing table, messages may be routed from one register to any other register without involvement of a server. When a message is received by a register instance other than the one to which it is addressed, that register consults its routing table to determine the next stop on the path until the message ultimately reaches the register to which it is addressed. As depicted in FIG. 2, messages from A to E pass through F, while A communicates directly with B, C, D and F. The system and method manages the data regardless of what the network topology is.

At the initiation of each register instance or when a register instance is logged off, a series of instructions executes to create a routing table on each register instance. All the devices operating as register instances then calculate a routing table for that device relative to the other devices. The register instances exchange a data structure representing a list of all of the available devices. This data structure may also contain entries that indicate whether one device is connected through another device. The routing table data structure is typically arranged as a representation of a series of rows, each row corresponding to one of the active register instances. In the column is the identity of the device where the data container must be sent in order to arrive at the device listed in the first column. As an example, the network of devices in FIG. 2 shows that for the data container to reach device F, it has to be transmitted to E, with F as the destination listed in the data container. Therefore, for row E, the second column entry is F. Other forms of routing table may be used, including a table where the second entry is the series of devices through which the message must pass to reach its destination. In the preferred embodiment, the register instances will execute a shortest-path calculation in order to populate the routing table. In one embodiment, Djikstra's algorithm may be used. In an alternative embodiment, each peer broadcasts to its connected peer a list of all of its connections. Any peer receiving a broadcast retransmits it to its other peers. In order to avoid traffic overload, the peer checks for data redundancies in the broadcast message and truncates the redundancies until all peers have the broadcast information and the process stops. In the preferred embodiment, each peer transmits its routing table for its local connection list to its connected peers. Each receiving peer then re-calculates its routing table in reliance on the incoming routing table. If the recalculated routing table has changes from its prior version, the peer broadcasts that revised routing table out to its peer list. By means of this technique, a network is created. In one embodiment, the register instance in the background continuously runs Bonjour™ to look for more register instances that it can connect to, and then if it finds one, it reruns the routing table calculation where the additional peer connection is included. If the routing table changes, then it is broadcast to its peer connections.

The system is able to operate a distributed process of updating customer orders. Because the initial order when opened is broadcast to all register instances, each register instance may be used to update the order. Each update, no matter which device is the originator, may update its local version of the order data structure and at the same time, broadcast that ticket to the other register instances. When a register instance receives a broadcast update to an order it has in local storage, it automatically updates that order. In addition, any one of the register instances may run a payment on the order, and then broadcast the result to all of the other register instances. In this manner, the collection of register instances operating on a collection of computers operates a fully distributed order processing system.

The broadcast of synchronizing updates to orders requires that conflicts be avoided due to timing or other aspects. In one embodiment each register instance follows a protocol that locks all of the orders unless a permission token is obtained. In one embodiment, the token is passed around from device to device, so that at any one time, only one device has the ability to update the order. However, the power to update the order includes the power to broadcast the update. Therefore, updates that are received by broadcast are updated locally without a token, while updates that are a result of input into the register instance, for example, an additional purchase, are only updated if the register instance has the ownership token. A register instance receives a data message (401) and determines whether the message is intended for that instance (402). If it is not the destination, then the register instance determines the next peer from its routing table (403) and passes the message on (404). The identity of the register instance with the ownership token is the register instance that last broadcast an update to the order (or, in the initial instance, the creation of the order.) That identity can be a data value present in the data payload comprising the broadcast update. When a register instance receives an update, it can write the update into the locally stored data structure representing the order, including the current identity of the ownership identity. If the register instance determines that the message is for that instance, it checks whether the message is a broadcast (405). If so, then the local data item is updated with the data in the message (406). In addition, the routing table is used to then pass the broadcast message on (413), (414). In this manner, a register instance that requires the ownership token for a particular order can then retrieve the identity of the current owner from local memory and then transmit a token request to that current owner of the order that has the token. The request contains the destination address of the token owner, and the requesting peer uses the routing table to determine where to transmit its request (403), (404). Any peer that receives a token request or broadcast, retransmits the request out to the correct peer on the path to the destination based on its local routing table. The re-transmitting peer is able to determine whether it is the destination or re-transmitting peer by inspecting the incoming request message and determining whether the destination in the message is its identifier. When that transmitting or requesting register instance receives the token and confirms its receipt, it becomes the new owner. When the new addition to the order is written into the local copy of the order, a broadcast message is also created by the requesting register instance that includes the update and the identity of the new current owner.

In one embodiment, the system is configured to prevent the situation where a peer requesting the token has failed to receive the latest broadcast. In one embodiment, the current token owner A broadcasts its changes to all of the other peers. The other peers respond with a confirmation of receipt. The identities of the confirming peers is stored in A's memory. When requesting peer B, sends a request for the token to A, A checks that B appears in the broadcast confirmation list. In another embodiment, the broadcast transmitted by A can have a unique tag, for example (and without limiting what the tag might be) a random number, a checksum or a timestamp. When a peer receives the broadcast, it stores the tag. When B requests a token from A, it also includes in the request the tag value. When A receives the token request (407), it checks the tag value (408) to see if it matches the latest broadcast A transmitted. If not, the request is denied (409). If it does, then it uses the routing table (410) to transmit the token (411) to the requesting peer, with the assurance that B will be modifying the latest version of the data item or check.

Updating Order with Token.
1. Register B sends request for Token to Register A
  at this point Register A holds Token and A can continue to update the check.
2. Register A sends Token to Register B
  at this point Register A holds Token, but no longer allows updating by A
  at this point Register B holds Token and allows updating by B
3. Register B acknowledges receipt of Token
  at this point Register A relinquishes Token
  Register B broadcasts update to A and other devices.
Failure Handling
1. Failure in 1
  Register A holds Token
  Register B may retry 1
2. Failure in 2
  Register A retries 2 until timeout and then reclaims ownership of Token Register B can retry 1
3. Failure in 3
  Register A retries 2 until timeout and then marks check as stuck on Register 2B
Failure in 3 may require user intervention
In the case where Register B went permanently offline then Register A will force its reclaim of the check. This is the same as what happens if a Register goes offline while owning a check. Otherwise, when Register A wants the check again, it can request Token from Register B.
Broadcast Updates:
1. Upon receiving a broadcast update:
  Update local copy of order with update.
  Revise indicated token owner with identity of register that transmitted broadcast.

In the preferred embodiment, all peers are connected using whatever radio interface is available, whether a Wi-Fi™ interface or Bluetooth™. The peers discover each other directly or by using shared network knowledge, or discovery by proxy. Each peer then informs every other peer about who its neighbors are. Where one peer is connected to another via Bluetooth, it can discover WiFi connected peers by using a middle man peer that is connected to both the Wifi network and to a peer using Bluetooth. In this manner, there is no need for a fully connected graph: peers can be connected through other routing or middle man peers using message forwarding. All peers are still connected together, but some of these could be considered virtual connections in nature.

Figure 3:
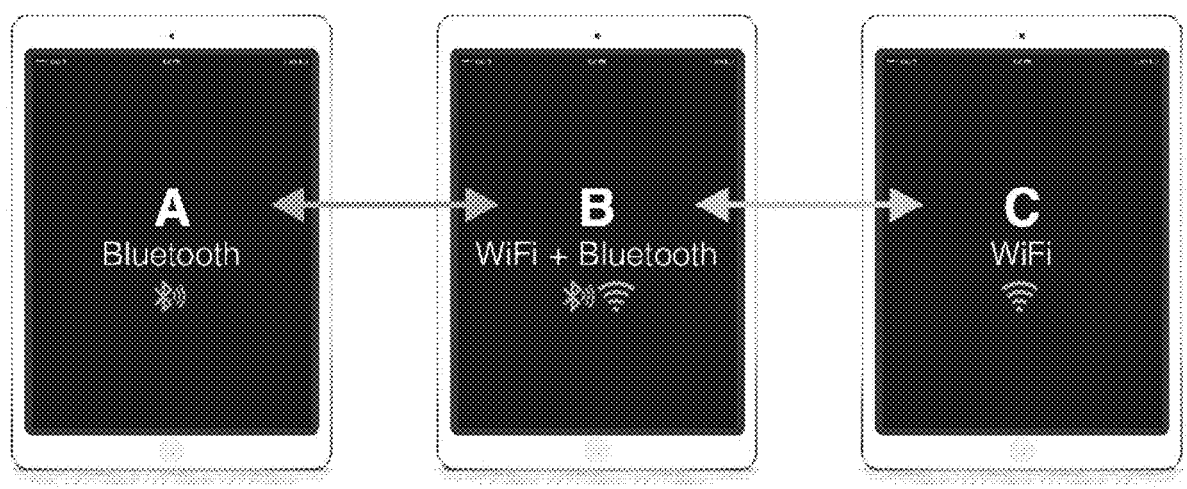
FIG. 3. Example of Peer connections.
Figure 4:
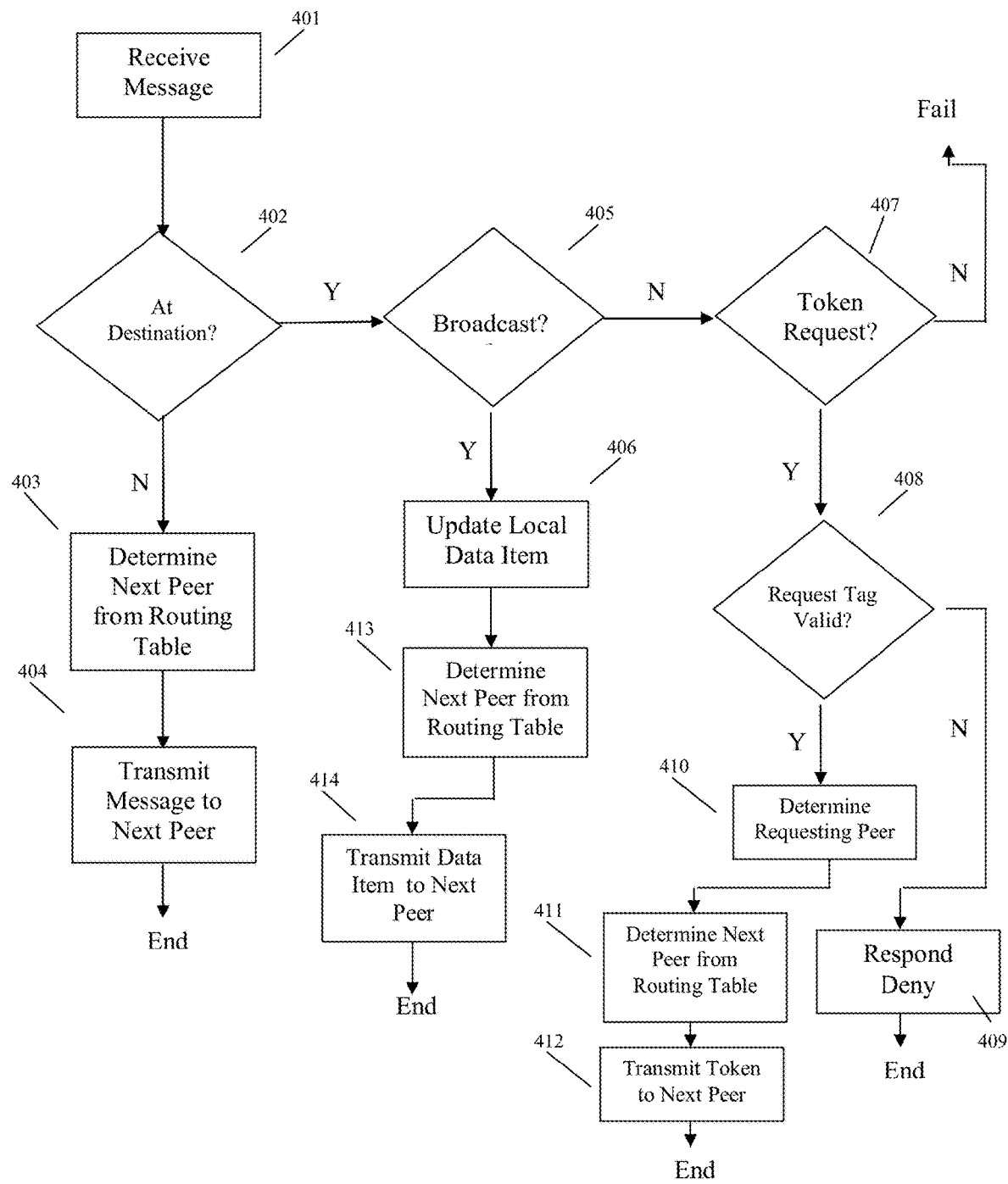
FIG. 4. Flowchart for Conflict Avoidance.

As shown in FIG. 3, there are three connected peers. A connects to B using Bluetooth. B connects to C using WiFi. The behavior is like a fully connected graph because B forwards messages it receives from A on to C. Peer to peer spurious connection not possible because when a register instance is activated, it gets an account identifier that is included in its peer to peer requests. Thus, if a peer device overextends into another account's network of peers its requests in that other account network will be denied. This may be accomplished in several ways. First, the wireless network may be password protected to be unique to and only usable by one set of related register instances. Second, when the routing table information is requested or transmitted, the protocol can contain a step of authentication, where the device that is to receive the must first submit an authorization token to the transmitting peer. That token may be derived from activation of the Register instance so that it is uniquely associated with the account controlling the set of related Register instances and shared among them. Third, upon initiation of each Register instance, which requires authentication with the server, an authorization token unique for that initiated instance may be broadcast from the server to each other Register instance. Fourth, the routing table and data payload may be encrypted using a key unique to the account that controls the shared register instances. The system assumes all peers have had an independent connection to the internet at least sufficient to activate the register instance. However, once activated, the peers will communicate among themselves without reliance on the Internet or a central server system.

Operating Environment:

The Register software operates as a local web stack, or web application, but the application runs locally on the computer operated as the cash register. The computer operates a browser, which in the preferred embodiment, is a prism browser with limited functionality. The browser accesses localhost3000, which runs the Mongrel web server application. The web server operates various code modules that are Ajax™ and Java™ scripts. Also running locally is a local database, for example, HeidiSql or mySql. By arranging the local software components as Ajax and Java scripts accesses locally, the platform is device independent. In one additional embodiment, the web application constituting the Register software instance can run on a hand-held computer, like an iPhone™ or Blackberry™ or similar so-called smartphone device.

The web server application also operates a background service that maintains interaction between the Register and the back office servers. When the Register processes a sale transaction, the background service is called to transmit the information to the back office computer. Likewise, when the back office updates its inventory or other variables relevant to the Register, the background service recognizes a request by the back office to update the data on the local computer and the updated is downloaded and stored.

In one embodiment, security is enhanced by encrypting the Ajax and Java script code. The installer program can take the unique numerical seeds derived from the hardware or some other password or user identifier to create a public/private encryption key pair that it uses to encrypt the code modules. The encrypting key is then erased. The decryption key is used to decrypt the code as it is requested to be run. This module can be inserted into the web server application so that it operates as a operating system service, which has enhanced security features as well. In another embodiment, the register software operates as a client application that runs on a iPad™. The application is written in Objective-C. The application includes modules for local data storage, network communications, printing, barcode scanning, and secure credit card processing. The register instance communicates to the backoffice application operating on a server or servers in order to receive updated inventory items and lookup historical sales. The register instance transmits records of all sale and return transactions, employee time clock punches, shift openings and closings and cash payouts.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer may be a laptop or desktop type of personal computer. It can also be a cell phone, smart phone or other handheld device. The precise form factor of the user's computer does not limit the claimed invention. In one embodiment, the user's computer is omitted, and instead a separate computing functionality provided that works with the central server. This may be housed in the central server or operatively connected to it. In this case, an operator can take a telephone call from a customer and input into the computing system the customer's data in accordance with the disclosed method. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A method to transmit for an order data an ownership change message corresponding to said order data, said method executed by a distributed computer system comprised of a server and a plurality of computers operating as register instances, the plurality of computers operating as register instances being connected using at least one wireless data network, said method comprising:

At the server, authorizing an additional computer operating as an activated register instance under a predetermined account identifier;

At the server, determining at least one active computers operating as register instances under the predetermined account identifier;

receiving at each of the at least one determined computers a data message from the server comprised of an identifier corresponding to the authorized additional computer operating as an activated register instance;

in response to the receiving step, recalculating at each of at least one determined computers and at the authorized additional computer, a corresponding at least one routing table data structure that encodes a next peer on a path to each of said at least one of the computers operating as register instances;

storing each of the at least one corresponding routing tables in the local memory of its corresponding at least one determined computers and the authorized additional computer;

receiving at a first of the computers operating as a register instance at least one ownership change data message comprised of data designating a second of the computers operating as register instances as destination of the message and owner of the order data and routing the received at least one ownership change message to the second of the computers operating as register instances using the at least one wireless communication network and without the at least one data message passing through the server by:

in at least one of the computers acting as register instances, calculating using the locally stored routing table, the next peer on a path to the second computer operating as a register instance; and transmitting the ownership change message to the calculated next peer.

2. The method of claim 1 further comprising:

receiving at a first of the plurality of computers operating as register instances a message comprised of a value that represents "broadcast"; and determining at least one computer operating as a register instance listed as a next peer connection in the routing table stored on the first computer operating as a register instance;

transmitting the message from the first computer operating as a register instance to the determined next peer connection, where the transmitted message is comprised of the value representing "broadcast."

3. The method of claim 1 further comprising:

receiving input command data representing an additional purchase into a first of the plurality of computers operating as a register instance and in response, updating a data structure representing an order stored on the first computer operating as a register instance to include data representing the additional purchase;

in response to the updating of the order, generating a data payload comprised of the updated order data, said payload further comprised of a value representing "broadcast"; and transmitting the data payload from the first computer operating as a register instance to all other computers operating as a register instance that are listed as a next peer connection in the routing table stored on the first computer;

at a second of the plurality of computers operating as a register instance, receiving a broadcast comprised of an updated order data payload;

determining a computer operating as a register instance in the system that owns the received order by inspecting the received order data payload;

generating a data payload comprising a request for ownership and a destination corresponding to the determined owning computer.

4. The method of claim 3 further comprising:

receiving at the first computer operating as a register instance a message representing a request for ownership of the order;

determining a computer operating as a register instance in the system corresponding to the change of ownership request by inspecting the data comprising the received message;

calculating a destination computer operating as a register instance from the routing table for routing an order ownership change data message to the determined computer; and transmitting the order ownership change data message to the destination computer operating as a register instance.

5. The method of claim 4 further comprising:

receiving at the first computer operating as a register instance a change of order ownership data message;

generating a data payload comprised of the updated order, an identification of a computer operating as a register instance designated as the owner of the order and a value indicating "broadcast"; and transmitting the generated data payload to a next peer indicated in the routing table of the first computer operating as a register instance.

6. The method of claim 4 further comprising:

Broadcasting from the first computer operating as a register instance the order to all of the other peer computers in the wireless computer network operating as a register instance;

receiving a confirmation of receipt from at least one of the other computers operating as a register instance;

storing in memory the identity of the confirming computers operating as a register instance; and determining whether an identity of the computer operating as a register instance requesting the change in ownership is listed among a set of predetermined stored identities, and if not, transmitting a response denying the request.

7. The method of claim 4 further comprising:

Broadcasting from the first computer operating as a register instance to the other computers operating as a register instance comprising the system the order data payload with a unique broadcast tag value corresponding to the content of the data payload;

storing on the receiving computers operating as a register instance comprising the system the order data and unique broadcast tag value;

receiving from the requesting computer operating as a register instance a tag included with the ownership change request; and confirming that the received tag matches the broadcast tag value.

8. The method of claim 3 further comprising the steps of:

receiving at the least one of the plurality of computers operating as a register instance a broadcast peer list;

updating at each computer operating as a register instance, its corresponding stored routing table using the received broadcast peer list;

calculating at said at least one of the plurality of computers operating as a register instance a peer list derived from the updated routing table stored on the said at least one of the plurality of computers operating as a register instance; and the at least one of the plurality of computers operating as a register instance transmitting to an at least one of its connected peers a data payload comprised of the received peer list.

9. The method of claim 8 further comprising:

at the at least one of the plurality of computers operating as a register instance, detecting any redundancies in the updated peer list; and truncating the redundancies from the data payload.

10. The method of claim 1 further comprising:

at the at least one of a plurality of computers operating as a register instance, receive connectivity information describing connectivity among at least a subset of the plurality of computers operating as a register instance; and Using the received connectivity information to calculate the peer list.

* * * * *